US012318741B2

(12) United States Patent
Ånesbug

(10) Patent No.: US 12,318,741 B2
(45) Date of Patent: Jun. 3, 2025

(54) METHOD AND DEVICE FOR CONDITIONING DRILLING FLUID

(71) Applicant: JAGTECH AS, Orkanger (NO)

(72) Inventor: Geir Olav Ånesbug, Meldal (NO)

(73) Assignee: JAGTECH AS, Orkanger (NO)

( * ) Notice: Subject to any disclaimer, the term of this patent is extended or adjusted under 35 U.S.C. 154(b) by 957 days.

(21) Appl. No.: 17/426,922

(22) PCT Filed: Feb. 5, 2020

(86) PCT No.: PCT/NO2020/050029
§ 371 (c)(1),
(2) Date: Jul. 29, 2021

(87) PCT Pub. No.: WO2020/162762
PCT Pub. Date: Aug. 13, 2020

(65) Prior Publication Data
US 2022/0097011 A1 Mar. 31, 2022

(30) Foreign Application Priority Data
Feb. 5, 2019 (NO) .................................. 20190161

(51) Int. Cl.
*B01F 25/23* (2022.01)
*B01F 25/312* (2022.01)
*B01F 35/21* (2022.01)
*B01F 35/213* (2022.01)
*B01F 35/22* (2022.01)
(Continued)

(52) U.S. Cl.
CPC .......... *B01F 25/23* (2022.01); *B01F 25/3121* (2022.01); *B01F 25/31243* (2022.01); *B01F 35/2111* (2022.01); *B01F 35/2113* (2022.01); *B01F 35/2115* (2022.01); *B01F 35/213* (2022.01); *B01F 35/2202* (2022.01); *E21B 21/062* (2013.01); *B01F 2101/49* (2022.01)

(58) Field of Classification Search
CPC ...................................................... B01F 25/23
USPC .......................................... 366/162.4, 162.5
See application file for complete search history.

(56) References Cited

U.S. PATENT DOCUMENTS 3,807,705 A 4/1974 Humkey et al.
3,833,718 A * 9/1974 Reed .................... B01F 25/432
166/305.1
(Continued)

FOREIGN PATENT DOCUMENTS

| | | | |
|---|---|---|---|
| CA | 2704175 | C | 8/2015 |
| RU | 2156855 | C2 | 9/2000 |
| WO | 2015199547 | A1 | 12/2015 |

OTHER PUBLICATIONS

International Search Report and Written Opinion dated May 4, 2020 for International Patent Application No. PCT/NO2020/050029.
(Continued)

*Primary Examiner* — David L Sorkin
(74) *Attorney, Agent, or Firm* — Alix, Yale & Ristas, LLP

(57) ABSTRACT

Method and device for conditioning of drilling fluid comprising supplying drilling fluid at high pressure to opposite placed inline directed high pressure nozzles arranged in fluid communication with a sealed spacing for shearing the supplied drilling fluid followed by additionally mixing by high velocity streams colliding, and discharging the conditioned drilling fluid through an outlet of the sealed spacing.

12 Claims, 2 Drawing Sheets

(51) Int. Cl.
*E21B 21/06* (2006.01)
*B01F 101/49* (2022.01)

(56) References Cited

U.S. PATENT DOCUMENTS

| | | | | |
|---|---|---|---|---|
| 4,944,599 | A * | 7/1990 | Soechtig | B29B 7/728 366/132 |
| 5,460,449 | A | 10/1995 | Kent et al. | |
| 5,779,361 | A | 7/1998 | Sugiura | |
| 5,927,852 | A * | 7/1999 | Serafin | B01F 25/4323 366/144 |
| 2014/0174830 | A1 | 6/2014 | Bingham et al. | |
| 2017/0274398 | A1 | 9/2017 | Vellaiah Retnaswamy | |

OTHER PUBLICATIONS

Nazarov, I.M. et al., "Methodical instructions for students on the implementation of term paper in the discipline Drilling fluids and cement slurries'," Almetviesk Polytechnical College, 2014, Exbure.ru (English translation and original pages).

* cited by examiner

METHOD AND DEVICE FOR CONDITIONING DRILLING FLUID

BACKGROUND

The disclosed embodiments relate to a method for conditioning drilling fluid, in addition to a device for conditioning drilling fluid.

Drilling fluids are fluids used in the enterprise of drilling a well, or a hole, in a formation. The scopes of the drilling fluid include keeping pressure under control, transport drill cuttings, cool the drilling equipment, transfer hydraulic power, transmit signals and aid logging in the well, or hole.

These drilling fluids range from pure liquids to complex dispersions, foams and emulsions that ideally will not unintentionally react chemically with the formation. For a dispersion, foam or emulsion to be stable it is necessary to provide enough shear to homogenise the mixtures.

Often, in practical operation, a drilling fluid is not considered stable until it has been circulated through the drill bit/nozzle with a pressure loss around 50 bar or more. For addition of new portions of drilling fluids, it is not practical to spend time to circulate through the drill bit.

Hence, the drilling rigs are equipped with a device for conditioning drilling fluid, also known as "shear gun", where the drilling fluids on the rigs can be homogenised by shear (so-called sheared) prior to being pumped into the well/hole.

In U.S. Pat. No. 3,807,705A (EI DU PONT DE NEMOURS AND COMPANY) is described a process and apparatus for the blending of a bed of particulate solids operating cyclically by selectively regulated downward gravity flow of a fraction of the solids, fluidized mixing outside of the bed, followed by recycle to the top of the bed.

From U.S. Pat. No. 5,779,361A (SHINYOU TECHNOLOGIES INC) is known a static mixer with a low-pressure loss and a high agitating/mixing efficiency. The mixer comprises in the midst of a fluid passage a mixing body having a larger diameter than the fluid passage. The mixing body has a mixing body cylinder portion, an inlet hollow portion having an inlet port fitted to the cylinder portion, and an outlet hollow portion having an outlet port. An impingement cylinder having a diameter larger than a diameter of the outlet port is disposed within the mixing body such that its opening is positioned in a confronting relation with the inlet port. A plurality of recesses is provided at least one of an inner side portion of bottom of the impingement cylinder, an inner surface portion of the hollow inlet port, an inner surface portion of the hollow outlet port, an inner circumferential portion of a cylindrical portion of the impingement cylinder, and an inner circumferential surface portion of the cylindrical portion of the mixing body.

U.S. Pat. No. 5460449A (KENT, J. HOWARD et al.) describes an in-line mixer without moving parts, with a generally conical shear head pointed in the upstream direction within a pipe, and centred near the downstream side of an annular seating ring fastened to the inside surface of the pipe. In the upstream, slanted face, or high-pressure side of the shear head, there is a series of generally circular ports bored through the shear head. The slanted face of the conical shear head extends through the centre of the seating ring in the upstream direction, and is adjusted to be located very close to the downstream side of the seating ring. At the downstream end of the slanted face of the shear head is a first sharp, approximately 90 degree edge leading away from the inside surface of the pipe in the downstream direction, which first edge is adjusted to be located very close to the inside surface of the pipe. This way, intense shearing forces are created at the edge of the downstream side of the annular seating ring near the inlets of the ports, and at the edge of the downstream end of the slanted face of the shear head near the inside surface of the pipe. Also, intense mixing forces are created at the downstream side of the annular seating ring near the inside surface of the pipe, and at the back of the shear head.

In U.S. 2014/174830A (BINGHAM RICHARD et al.) is described a system for conditioning drilling fluid including a conditioning device having a first conduit configured to receive the drilling fluid, a flow restriction disposed adjacent the first conduit, the flow restriction comprising a fluid inlet and a fluid outlet, an impact plate disposed downstream of the flow restriction, a first chamber disposed between the flow restriction and the impact plate, and a second chamber disposed downstream of the impact plate, wherein the first chamber is fluidly connected to the second chamber. A method for conditioning drilling fluid using a conditioning device, includes pumping a drilling fluid through a flow restriction, accelerating the drilling fluid into a mixing chamber, subjecting the drilling fluid to elongational shearing, decelerating the drilling fluid against an impact plate, subjecting the drilling fluid to impact shearing, and emptying drilling fluid from the mixing chamber.

From WO2015199547 A1 (KCA DEUTAG DRILLING NORGE AS) it is known a shear gun for drilling fluids comprising a housing in the form of an elongated, internally hollow body arranged to receive drilling fluid, as the housing comprises an internal space equipped with a high pressure nozzle that is connected with an inlet that extends through a first, upper part of the elongated body of the housing and an opposing distribution cone that is arranged in a second, lower part of the elongated body of the housing. A number of openings or slits is provided in the upper part of the hollow space of the housing, arranged to function as liquid outlets for mixed drilling fluid and that the nozzle opening of the high-pressure nozzle is mounted lower than said openings or slits in the hollow space of the housing.

From Methodical instructions for students for the discipline "Drilling fluids and cement slurries," Nazarov I.M., Almetviesk polytechnical college, 2014, and Hydraulic dispergator DG-40, Exbure.ru, are known a method and a device (hydraulic dispergator) for dispersing of drilling fluid, wherein the method comprises suppling fluid at high pressure to opposite placed inline directed high pressure nozzles arranged in fluid communication with sealed spacing for shearing supplied drilling fluid and discharging the dispergated fluid through an outlet. The method comprises a premixing stage and utilises venturi effect for mixing substances into drilling fluid.

In EP 0488666 A is described mud mixer for mixing an initially particulate solid additive into a substantially continuous flow of liquid drilling mud, wherein said mud mixer comprises a mixing chamber having two mud injection nozzles and an additive inlet for admitting a substantially continuous flow of said additive into said mixing chamber simultaneously with the two injected streams of mud in use of said mud mixer.

Today's plants are constructed in such a way that this is done in drilling mud tanks which are on board the rigs, and a jet from a nozzle goes directly down into the mud in the tank. The force of the jet results in that it goes deep into the tank, and often the residual power in the jet is great when this meets the tank wall. By varying levels in the tank, residual forces will vary, and the jet is broken down by the mud level in the tank. This can result in washout of the tank wall, and also that much noise is generated. Access for maintenance of tanks and nozzles must be done by entering the tank, which is risky and time-consuming. If one gets a washout and holes in the tank wall this can result in discharges to the external environment.

Additionally, in connection with transport of drilling fluid/mud to a rig by supply vessel, the drilling fluid/mud will degenerate. By continuous shearing the drilling fluid/mud during the transportation, this will optimize the quality and make it ready for use. This also applies for onshore storage and production facilities.

Challenges to the mentioned prior art are therefore linked to, among other things, noise, washout of tank walls, vulnerability to fluctuating levels in the tank, and also that the solutions are often not designed for the purpose.

A further considerable drawback of the mentioned prior art solutions is that the efficiency thereof is limited.

The prior art solutions are further space demanding and designed for specific applications, i.e., are not designed to be used for more than one application.

Accordingly, the prior art solutions are mainly adapted for stationary arranged and not flexible as regards arrangement in a drilling fluid handling process.

SUMMARY

The disclosed method and device for conditioning drilling fluid partly or entirely solves the above-mentioned lacks and drawbacks of prior art.

The method and device for conditioning drilling fluid has higher capacity than prior art solutions.

The method and device for conditioning drilling fluid has higher efficiency that prior art solutions.

The device for conditioning drilling fluid is plain to mount and/or dismantle.

The device for conditioning drilling fluid is considerably less space-demanding than prior art solutions.

The method and device for conditioning drilling fluid provides as much mixing energy as possible.

Also provided is a method and device for conditioning drilling fluid that is flexible with regard to arrangement in a drilling fluid handling process and may be used in a wide range of applications.

Also provided are a device for conditioning drilling fluid that is scalable according to requirements and flow rate.

Also provided are a method and device for conditioning drilling fluid that provides opportunity for pre-mixing of the drilling fluid in front of or in in a shearing nozzle for coarse mixing.

Also provided are a device for conditioning drilling fluid enabling possibilities for plain instrumentation as regards pressure difference, temperature and flow. The method and device for conditioning drilling fluid provide for mixing one or more fluids, chemicals and/or substances into the drilling fluid.

A method for conditioning of drilling fluid according to the comprises supplying drilling fluid at high pressure to opposite placed inline directed high pressure nozzles arranged in fluid communication with a sealed spacing for shearing the supplied drilling fluid followed by additionally mixing by high velocity streams colliding, and discharging the conditioned drilling fluid through an outlet of the sealed spacing.

The method may further comprise utilizing venture effect for mixing one or more fluids, chemicals and/or substances, such as one or more oils or water, into the drilling fluid.

The method may further comprise pre-mixing of the drilling fluid in front of or in the shearing nozzle.

A device according to the disclosure comprises a mainly elongated main body provided with inlets for supply of drilling fluid at ends thereof and an outlet for discharge of conditioned drilling fluid.

The device is based on the use of opposite placed inline directed high pressure nozzles arranged in connection with the inlets for drilling fluid that combine the shear effect through the high-pressure nozzles and additionally mixing by high velocity streams colliding, reducing the impact forces on the construction.

In the process of homogenising a dispersion or an emulsion it is necessary to apply enough mixing energy. As much as possible of the particle aggregates or agglomerates must be broken. Similarly, for an emulsion it is necessary to break all the emulsified liquid into as fine droplets as possible. As described above, a drilling fluid can be both a dispersion or an emulsion or a combination of these. Hence, it is necessary to create as much mixing energy as possible.

Drilling fluids can also contain different concentration of polymers. Some of the polymers can soften the turbulence in the device for conditioning drilling fluid, also known as shear guns, and thereby require longer mixing time. Other polymers can be broken by to high shear. Hence, it is important to have a device presenting as much shear as possible, but at the same time be able to reduce the rate of shear if needed.

A water-based drilling fluid normally contains polymers and bentonite for building the required viscosity. Similarly, an oil-based drilling fluid normally contains emulsified water and organophilic clay to build viscosity. Common for both drilling fluid types is that they contain fine-grained high-density minerals to create the necessary fluid density. The most commonly used high density material is barite with a particle size distribution typically less than 75 micron. Occasionally, harder and even higher density materials like ilmenite or hematite are used. When these high-density materials are mixed into the drilling fluid there is a higher probability for creating wear. This wear can be significantly reduced or even removed if the fluid jets within the device for conditioning drilling fluid is colliding instead of hitting a surface or going through rotating shear blades.

Accordingly, by the disclosed embodiments it is provided a device that efficiently will shear the drilling fluids and after the shearing mix them.

The disclosed embodiments further provide a device that will considerably reduce the noise from the process, compared to prior art solutions, by utilizing conditioned drilling fluid as a sound dampener around the shearing and mixing process.

The device is applicable on drilling rigs, during transportation, on drilling fluid storage facilities both on rigs and on drilling fluid plants.

The device is further applicable for treatment on drilling fluid under transport, storing and processes onshore, on vessel transport and onshore units. E.g., by circulating the drilling fluid through the device.

The device provides for conditioning drilling fluid that is suitable for use in a complete drilling fluid/mud treatment container-/skid-based system.

The device provides for conditioning drilling fluid wherein the shearing nozzles are easily exchangeable.

The device requires less pace, compared to prior art solutions, and can be arranged inline in a process.

The device is further easy to assemble, disassemble, store and decommission. Disclosed embodiments further enable use of environmentally friendly reusable materials in most of the parts.

The device may be supplied with drilling fluid from existing high-pressure pumps on site or by at least one dedicated high-pressure pump integrated with one or more devices according to the present invention as one unit.

Several of the disclosed devices may be arranged in parallel if desired.

Further preferable features and advantageous details of the disclosed method and device will appear from the following detailed description and drawings.

BRIEF DESCRIPTION OF THE DRAWINGS

The present invention will below be described in further detail with references to the attached drawings, where.

DETAILED DESCRIPTION

Figure 1:
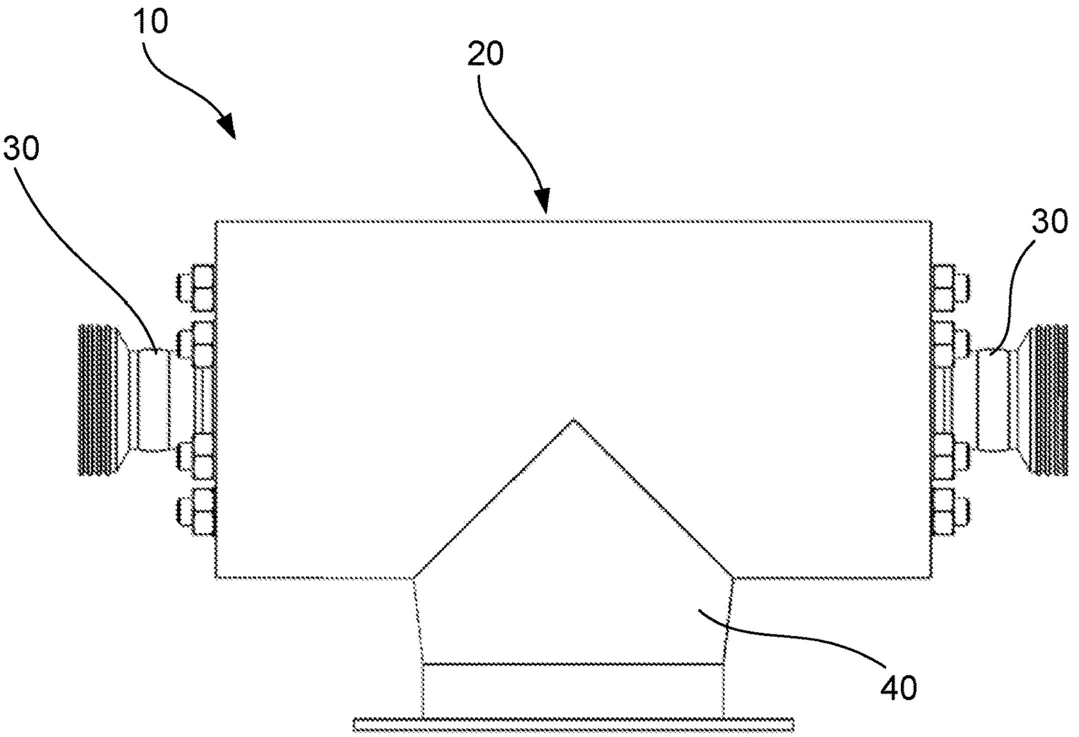
FIG. 1 is principle drawing of the disclosed device for conditioning drilling fluid.
Figure 2:
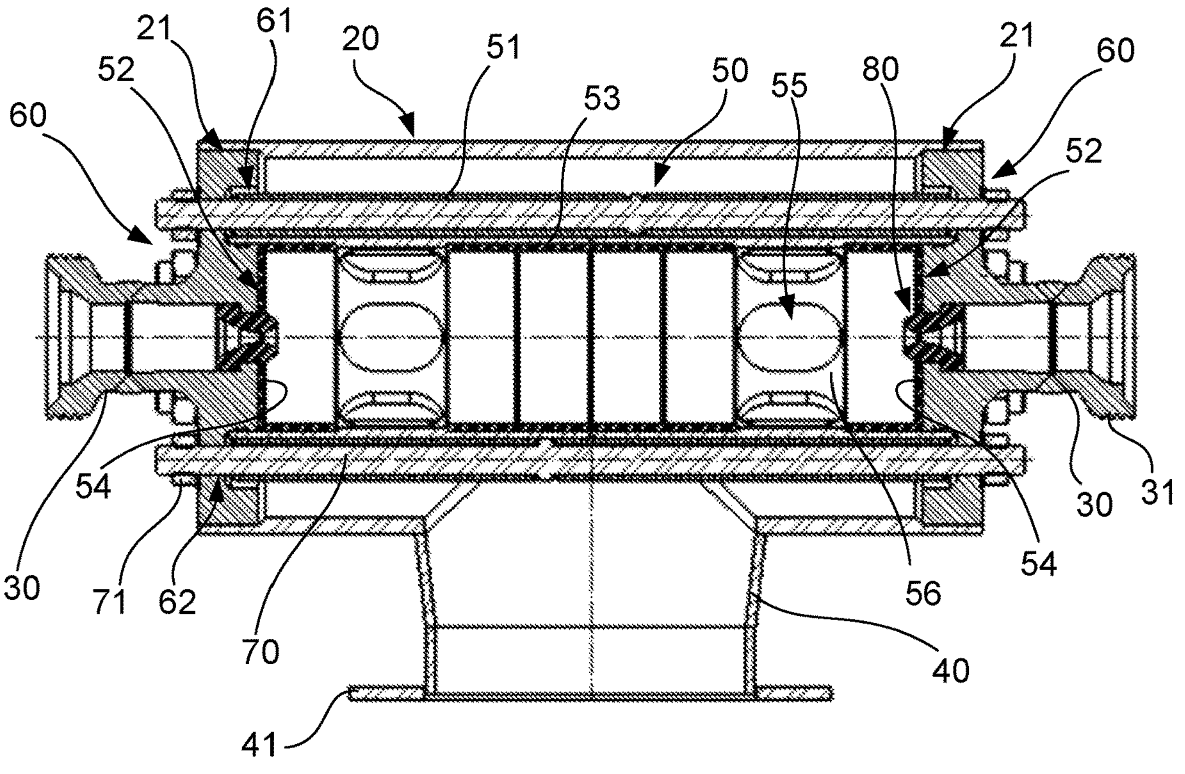
FIG. 2 is a cross-sectional view of the device for conditioning drilling fluid in FIG. 1, and FIGS. 3A and 3B are principal drawings of modifications of a device for condition drilling.

Reference is now made to FIGS. 1 and 2 for description of device 10 for conditioning drilling fluid according to a first embodiment. The device 10 for conditioning drilling fluid may also referred to as a shear gun.

The device 10 for conditioning drilling fluid according to the first embodiment comprises a mainly elongated main body 20 provided with inlets 30 at opposite ends for receiving drilling fluid thereof and an outlet 40 for discharge of conditioned drilling fluid.

The device 10 for conditioning drilling fluid is further provided with an interior housing 50 arranged in the mainly elongated main body 20 in the form of a horizontal hollow body 51 arranged to receive drilling fluid at both ends 52 thereof.

The inner surfaces of the horizontal hollow body 51 are surfaced with radially extending hard metal rings 53, such as of wolfram carbide, polycrystalline diamond, Polycrystalline cubic boron nitride, ceramic material or electroplated diamond coting as well as hard metal plates 54 at the ends 52, such as of wolfram carbide, polycrystalline diamond, Polycrystalline cubic boron nitride, ceramic material or electroplated diamond coating to reduce wear of the internal space of the hollow body 51.

The hollow body 51 is further provided with at least one opening 55, such as a hole, slot or slit, from the inner space of the hollow body 51 to the exterior thereof arranged to function as fluid outlets for conditioning drilling fluid. In the shown embodiment there are arranged two radially extending sections 56 comprising a number of openings 55, at each side of a vertical centre axis of the hollow body 51.

Preferably at least one opening 55 is arranged at a lower side of the hollow body 51 to enable drainage of the device 10 when not in use.

The hollow body 51 of the inner housing can further be divided in several part that at assembly in the main body 20 from the hollow inner body 51. This will ease the insertion of the mentioned rings 53 and plates 54 in the hollow body 51.

Instead of the mentioned rings 53 and plates 54, the inner surfaces of the hollow body 51 may be provided with a coating of hard metal, such as of wolfram carbide, polycrystalline diamond, Polycrystalline cubic boron nitride, ceramic material or electroplated diamond coating, at interior surfaces thereof. In another alternative the hollow body 51 is made of hard metal, such as wolfram carbide, polycrystalline diamond, Polycrystalline cubic boron nitride, ceramic material or electroplated diamond coating.

The mainly elongated main body 20 this encloses the hollow body 51 of the interior housing 50 with a spacing therebetween.

The outlet 40 of the main body 20 is in the shown embodiment arranged at a lower side thereof, preferably provided with a flange 41 for arrangement topside of storage tank or process piping directed horizontally or vertically. By that the outlet 40 is arranged at lower side thereof this will ensure that the device 10 is drained when not in use.

The device 10 for conditioning drilling fluid is further provided with detachable sides 60 arranged for sealing the ends of the main body 20 and the ends 52 of the hollow body 51 of the inner housing 50.

In the shown embodiment the main body 20 is provided with interior annular recesses 21 at ends thereof arranged for receiving and accommodating the detachable sides 60.

The detachable sides 60 are further, at sides facing the hollow body 51, provided with annular recesses 61 adapted for receiving and accommodating the ends 52 of the hollow body 51 of the interior housing 50.

The detachable sides 60 are thus retained by the main body 20 and the detachable sides 60 retain the inner housing 50. The detachable sides 60 are further provided with through holes 62 for receiving and accommodating fastening rods or bolts 70 extending through the device 10, where nuts 71 are arranged to secure the sides 60 to the main body 20 and inner 50 housing together. The hollow body 51 of the inner housing 50 may further be provided with longitudinally extending through holes for receiving and accommodating the fastening rods or bolts 50.

The mentioned inlets 30 of the device 10 for supply of drilling fluid are arranged in the detachable sides 60. The inlets 30 are provided with connectors 31 for connection of a drilling fluid supply hose, pipe, tube or similar. The inlets 30 are in fluid communication with the interior space of the hollow body 51 via high pressure nozzles 80 arranged in the detachable sides 60, extending into the inner hollow body 51, which high pressure nozzles 80 exhibit a reduction in inner diameter form the inlet 30 to the inner space of the hollow body 51. The high-pressure nozzles 80 are thus arranged opposing and inline of each other in the hollow body 51 and will thus supply fluid from opposite sides into the hollow body 51. The high-pressure nozzles 80 are preferably made of or applied an inner surface of hard metal, such as of wolfram carbide, polycrystalline diamond, Polycrystalline cubic boron nitride, ceramic material, or electroplated diamond coating. In a further embodiment the high-pressure nozzle 80 are arranged with a controllable opening thereof, as described below with references to the FIGS. 3A and 3B. In yet a further embodiment the high-pressure nozzles 80 are formed as a venturi nozzle. The high-pressure nozzle 80 may be integrated in the detachable sides 60 or exchangeably arranged in the detachable sides 60 via threads (not shown).

There will further be arranged sealing devices (not shown) between the detachable sides 60 and the main body 20.

The device 10 for conditioning drilling fluid thus works by that at least one high pressure pump (not shown) supplies drilling fluid at high pressure to both inlets 30, preferably with the same pressure, where the drilling fluid as it passes the high pressure nozzles 80 is cut/crushed whereupon the cut/crushed drilling fluid flowing from both sides collide at centre of the hollow body 51 of the inner housing 50, where they are mixed and leaves the inner housing 50 via the openings 55 and is collected in the main body 20. The presence of conditioned drilling fluid in the main body 20 will reduce sound from the process. The conditioned drilling fluid will then exit the device 10 through the outlet 40 of the main body 20 to a storage tank, process piping or similar.

The high velocity flow of cut/crushed drilling fluid will also result in that a high degree of mixing is achieved.

The at least one high pressure pump can be a dedicated pump for the device 10 or available high-pressure pumps at the site.

If only one high-pressure pump is used there will have to be a splitter arranged in front of the device 10, diving the flow from the high-pressure pump to the two inlets 30 of the device 10.

Figure 3A:
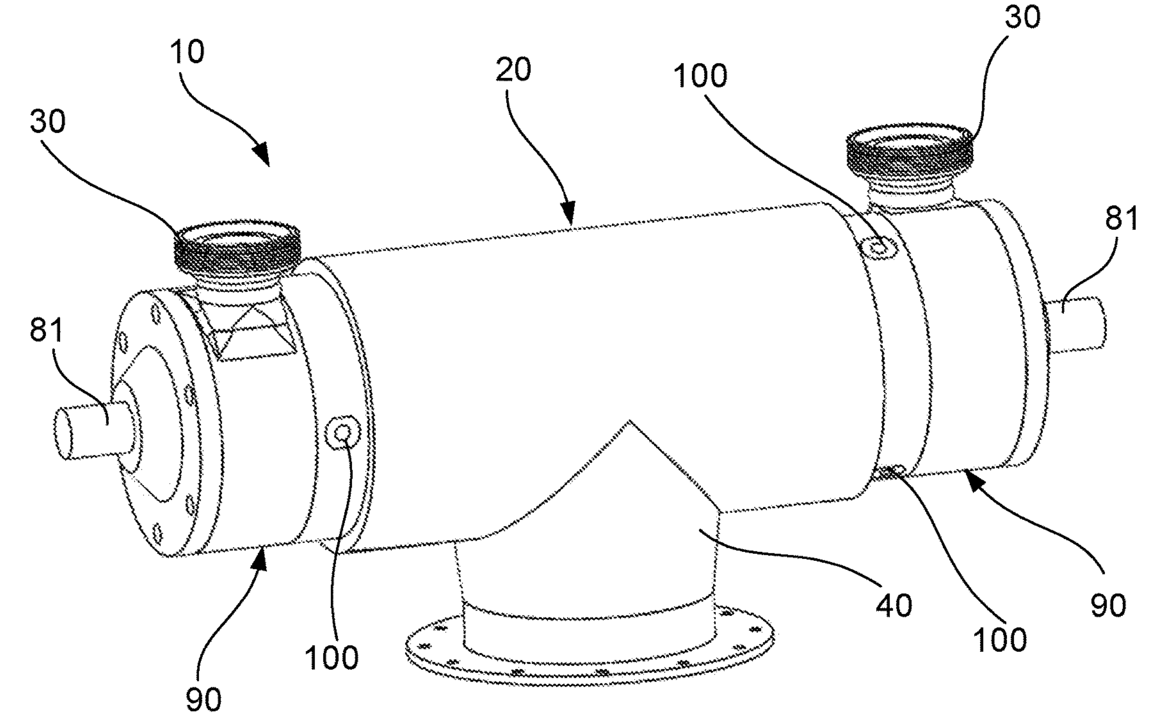
Figure 3B:
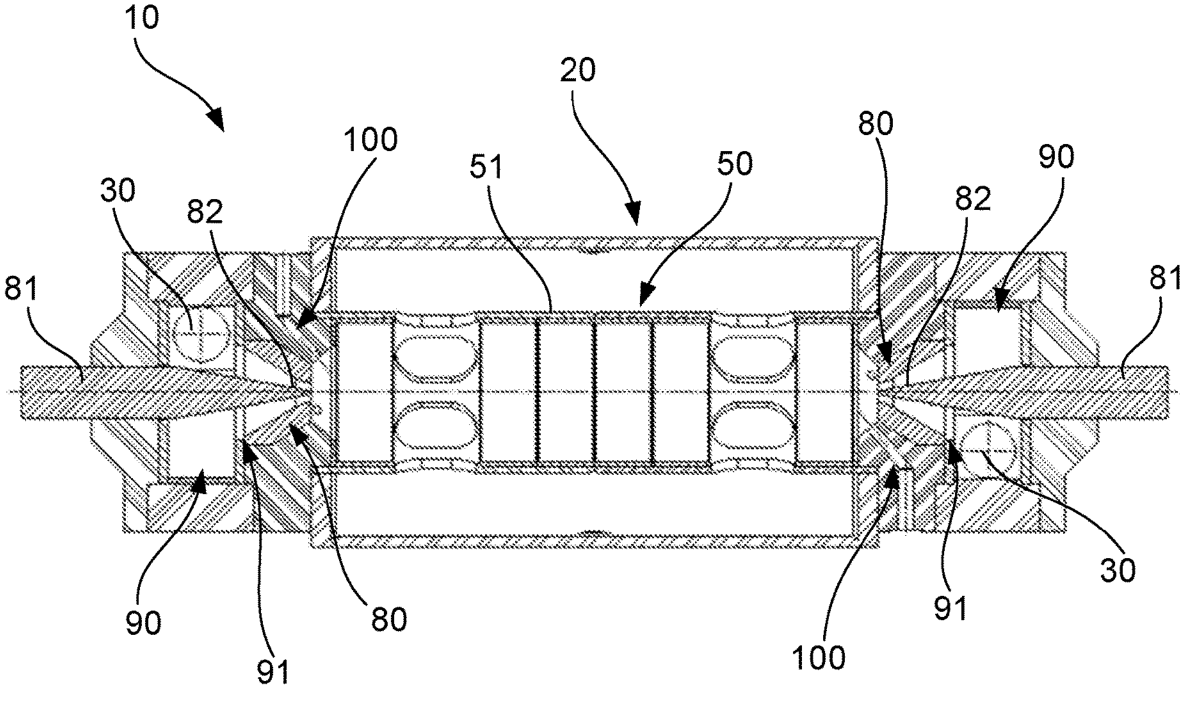

Reference is now made to FIGS. 3A and 3B which are principal drawings of possible modifications of the above-described device 10 for conditioning of drilling fluid, wherein FIG. 3B is a cross-sectional view seen from above. Some of the parts described are omitted for clarity, and the reference number for many of the parts above are omitted for clarity.

According to an alternative embodiment of the device 10 for conditioning drilling fluid it is provided with means 90 for pre-mixing of the drilling fluid in front of the nozzles 80. This may be achieved by arranging a mixing zone/are or chamber 90 in front of the nozzle 80 which chamber 90 is provided with an outlet 91 facing the nozzle 80. In the shown embodiment this chamber 90 is mainly cylindrical or disc-shaped, and the drilling fluid inlet 30 are further arranged to supply the drilling fluid radially to the chamber 90 which will create a vortex effect on the supplied drilling fluid which provides a mixing effect to the drilling fluid before entering the nozzles 80.

Inner surfaces of the mentioned chamber 90 is preferably surfaced with a coating or sintered hard metal, such as of wolfram carbide, polycrystalline diamond, Polycrystalline cubic boron nitride, ceramic material or electroplated diamond coating. Alternatively also this embodiment may make use of hard metal ring(s) as described above, wherein an opening is arranged corresponding with the inlet 30.

The chamber 90 may further be provided with blades or vanes for improved pre-mixing.

According to a further embodiment the nozzles 80 may be adjustable. According to one embodiment this is achieved by that the nozzles 80 further is provided with a stem 81 with a tapering end 82 facing the nozzle 80 opening, which stem 81 is arranged movable in longitudinal direction of the nozzle 80 along the longitudinal center axis of the nozzle 80 by means of an actuator (not shown) or by manual adjustment. Accordingly, the nozzle 80 opening may be adjusted by a control unit (not shown) arranged for controlling the actuator based on measuring equipment arranged in connection with the device, such as measuring equipment for measuring one or more of: pressure difference, temperature, flow, quality and/or content of the conditioned drilling fluid.

According to a further alternative embodiment of the device 10 for conditioning drilling fluid the device 10 may be arranged to utilize venturi effect for mixing in one or more fluids, chemicals and/or substances, such as one or more oils or water, into the drilling fluid. In the shown embodiment this may be achieved by that the device 10 is provided with one or more inlets 100 for supply of fluid, chemical or substance leading from the exterior of the device 10 to in front of or in the nozzles 80. By this is achieved that when fluid, chemical or substance is supplied to the mentioned inlet 100 the venturi effect caused by the nozzles 80 will draw in the mentioned fluids, chemicals and/or substances in connection with shearing/cutting the drilling fluid.

By arranging several such inlets 100 distributed in circumferential direction of the nozzle 80 an improved effect is achieved when supplying the same fluid, chemical or substance, or the several inlets 100 may be used to mix different fluids, chemicals and/or substances into the drilling fluid.

It addition to arranging measuring equipment in connection with the device 10, measuring equipment to be used by the device may also be arranged in connection with other parts of a drilling fluid handling process.

It will be possible to achieve desired properties of the drilling fluid (mud). The device 10 will be able to handle pressure up towards 500 bar, and an amount of liquid between 1000-1500 I/min.

Accordingly, the device for conditioning drilling fluid can be mounted into an existing process horizontally in any stage of the drilling fluid (mud) handling process.

The device is easy to mount/dismantle, and further is considerably less space-demanding than prior art solutions.

The wear parts of the device are further replaceable without down time in drilling.

The device for conditioning drilling fluid are thus in combination with a pump suitable as a stand-alone unit that may be arranged inline for a wide range of applications, such as but not limited to, rigs, supply vessels or onshore plants.

The device can further be provided with an obstruction, shaped with a planer, convex or concave surface, in center of the hollow body of the inner housing.

The invention claimed is:

1. A device for conditioning drilling fluid, comprising:

a substantially elongated main body provided with inlets for supply of the drilling fluid and located at opposite ends, and an outlet for discharge of the drilling fluid;

oppositely arranged nozzles that are adjustable inline directed high pressure nozzles, said nozzles being arranged in connection with the inlets and being configured to combine shear effect through said nozzles and to mix the drilling fluid using colliding high velocity streams;

an inner housing arranged in the elongated main body, the inner housing being formed by a hollow body into which said nozzles extend from each end, said hollow body being further provided with at least one opening for discharge of the drilling fluid to said elongated main body;

said elongated main body enclosing the inner housing and having a spacing therebetween for accommodating the drilling fluid; and said device for conditioning drilling fluid further comprising:

measuring equipment for measuring one or more of pressure difference, temperature, flow, quality and content of the drilling fluid, and a control unit for controlling opening of said nozzles based on the measured one or more of the pressure difference, the temperature, the flow, the quality and content of the drilling fluid.

2. The device according to claim 1, wherein:

the hollow body is made of a material selected from the group consisting of wolfram carbide, polycrystalline diamond, polycrystalline cubic boron nitride, ceramic material and electroplated diamond coating, inner surfaces of the hollow body are provided with a coating selected from the group consisting of wolfram carbide, polycrystalline diamond, polycrystalline cubic boron nitride, ceramic material and electroplated diamond coating, or inner surfaces of the hollow body are surfaced with radially extending rings made from a material selected from the group consisting of wolfram carbide, polycrystalline diamond, polycrystalline cubic boron nitride, ceramic material and electroplated diamond coating, and plates at the ends thereof, the plates being formed from a material selected from the group consisting of wolfram carbide, polycrystalline diamond, polycrystalline cubic boron nitride, ceramic material and electroplated diamond coating.

3. The device according to claim 1, further comprising detachable sides arranged for sealing ends of the elongated main body.

4. The device according to claim 3, wherein the elongated main body is provided with annular recesses at the ends thereof which are configured for receiving and accommodating the detachable sides.

5. The device according to claim 1, wherein the detachable sides, at sides facing said hollow body, are provided with annular recesses configured for receiving and accommodating the ends of said hollow body.

6. The device according to claim 3, wherein said inlets are arranged in the detachable sides and said inlets are in fluid communication with an interior space of said hollow body via said nozzles.

7. The device according to claim 1, wherein the outlet is provided with a flange for connection to a storage tank or process piping.

8. The device according to claim 1, wherein said nozzles are provided with supply inlets arranged for supplying of one or more fluids, chemicals and substances in connection with shearing or cutting.

9. The device according to claim 1, wherein the device further comprises mixing chambers for pre-mixing the drilling fluid, said mixing chambers being located in front of or inside said nozzles.

10. A device for conditioning drilling fluid, comprising:

a substantially elongated main body having first and second opposite ends;

a first inlet associated with the first end and supplying the drilling fluid;

a second inlet associated with the second end and supplying the drilling fluid;

an outlet for discharge of the drilling fluid from the elongated main body;

a first adjustable inline directed nozzle arranged in connection with the first inlet;

a second adjustable inline directed nozzle arranged in connection with the second inlet;

an inner housing used for shear mixing the drilling fluid and being arranged in the elongated main body, the inner housing being formed by a hollow body into which said first and second nozzles extend, said hollow body being further provided with at least one opening for discharge of the drilling fluid to said elongated main body;

said elongated main body enclosing an annular spacing located outside of the hollow body, said annular space forming a drilling fluid storage chamber that is located radially outside of a zone where high velocity streams collide inside the inner housing; and said device for conditioning drilling fluid further comprising:

measuring equipment for measuring one or more of pressure difference, temperature, flow, quality and content of the drilling fluid, and a control unit for controlling opening of said nozzles based on the measured one or more of the pressure difference, the temperature, the flow, the quality and content of the drilling fluid.

11. The device according to claim 10, further comprising first and second detachable sides arranged for respectively sealing the first and second ends of the elongated main body.

12. A device for conditioning drilling fluid, comprising:

a substantially elongated main body having first and second opposite ends;

a first inlet associated with the first end and supplying the drilling fluid;

a second inlet associated with the second end and supplying the drilling fluid;

an outlet for discharge of the drilling fluid from the elongated main body;

a first adjustable inline directed nozzle arranged in connection with the first inlet;

a second adjustable inline directed nozzle arranged in connection with the second inlet;

an inner housing used for shear mixing the drilling fluid and being arranged in the elongated main body, the inner housing being formed by a hollow body into which said first and second nozzles extend, said hollow body having an annular wall provided with plural discharge openings allowing the drilling fluid to exit from inside the hollow body;

said elongated main body enclosing an annular spacing located radially outside of the hollow body, said annular space forming a drilling fluid storage chamber that is located radially outside of a zone where high velocity streams collide inside the inner housing; and said device for conditioning drilling fluid further comprising:

measuring equipment for measuring one or more of pressure difference, temperature, flow, quality and content of the drilling fluid, and a control unit for controlling opening of said nozzles based on the measured one or more of the pressure difference, the temperature, the flow, the quality and content of the drilling fluid.

* * * * *